United States Patent
Yuasa

(10) Patent No.: US 7,360,107 B2
(45) Date of Patent: Apr. 15, 2008

(54) METHOD OF CONTROLLING POWER WITHIN A DISK ARRAY APPARATUS

(75) Inventor: Kentarou Yuasa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 346 days.

(21) Appl. No.: 11/117,303

(22) Filed: Apr. 29, 2005

(65) Prior Publication Data

US 2006/0168464 A1 Jul. 27, 2006

(30) Foreign Application Priority Data

Jan. 25, 2005 (JP) .............................. 2005-016998

(51) Int. Cl.
*G06F 1/00* (2006.01)

(52) U.S. Cl. ..................... 713/340; 713/300; 713/320; 365/226; 365/227

(58) Field of Classification Search ................ 713/340, 713/330, 300, 320; 365/226, 227
See application file for complete search history.

(56) References Cited

U.S. PATENT DOCUMENTS 4,868,832 A * 9/1989 Marrington et al. .......... 714/22
5,452,256 A * 9/1995 Ichikawa ..................... 365/226
6,079,026 A * 6/2000 Berglund et al. ............ 713/340
6,268,665 B1 * 7/2001 Bobry .......................... 307/66
6,311,279 B1 * 10/2001 Nguyen ....................... 713/300
7,058,835 B1 * 6/2006 Sullivan et al. ............. 713/324

FOREIGN PATENT DOCUMENTS

| JP | 5-211729 | 8/1993 |
| JP | 9-200974 | 7/1997 |
| JP | 2000-184615 | 6/2000 |

* cited by examiner

*Primary Examiner*—Chun Cao
*Assistant Examiner*—Malcolm D Cribbs
(74) *Attorney, Agent, or Firm*—Staas & Halsey LLP

(57) ABSTRACT

A power supply unit generates a predetermined voltage from power supplied from an external power supply and outputs the voltage to a power supply line. A battery charge/discharge circuit charges a battery with the voltage supplied and determines whether to supply an output voltage of the battery to the power supply line to activate a backup power supply based on an output control signal. A monitoring unit judges whether a disk array apparatus is operable in accordance with an instruction from a host computer, and outputs, when the disk array apparatus is operable, an output signal for activating the backup power supply, and when the disk array apparatus is not in the operation mode, outputs an output control signal for inactivating the backup power supply to the battery charge/discharge circuit.

6 Claims, 5 Drawing Sheets

METHOD OF CONTROLLING POWER
WITHIN A DISK ARRAY APPARATUS

BACKGROUND OF THE INVENTION

1) Field of the Invention

The present invention relates to a disk array apparatus, and more particularly to a system power supply and a backup power supply in the disk array apparatus.

2) Description of the Related Art

In recent years, various kinds of data are treated on computers in an electronic form and an amount of the data is in an increasing trend. Therefore, a storage that efficiently stores a large amount of data is demanded. A disk array apparatus is one example of such storage.

The disk array apparatus applies a technology of a redundant array of inexpensive disks (RAID). In the RAID, more than one hard disk is connected in parallel, and the hard disks connected are managed as a single unit of a hard disk.

The RAID includes a RAID-0 in which identical data is stored in each of several hard disks and RAID-5 in which data is stored while distributing parity information of the data to hard disks. Use of the RAID realizes improved reliability of data to be stored.

Generally, a disk array apparatus includes a cache memory to reduce a time required for accessing data that is stored in the disk array apparatus. The cache memory also applies a measure for improving reliability of the data. For example, a block check character (BCC) is written in several hard disks for protecting the data, or the same data is stored in two cache memories for mirroring.

For the improved reliability of the data, a measure to improve physical and electrical reliability of the data is also required in addition to such a logical data protection described above. Such measure includes protection of data at the time of power failure. The disk array apparatus operates with power that is supplied from an external power supply, such as a commercial power supply. Therefore, in case of power failure, data that is being processed can be lost. To prevent loss of the data, the disk array apparatus includes a backup power supply.

Specifically, when the disk array apparatus detects power failure, a controller of the disk array apparatus suspends operation under processing. Then, the controller notifies a host computer of occurrence of the power failure and executes a backup processing. In the backup processing, data that is held in a volatile cache memory, which is data that can be lost due to the power failure, in a hard disk. A time required for the backup processing ranges from several minutes to several tens of minutes depending on a capacity of the cache memory and the number of hard disks in which the data in the cache memory is to be written. Since power is not supplied from the external power supply during the backup processing, the disk array apparatus includes the backup power supply that supplies power for executing the backup processing.

Conventionally, various technologies relating to the backup power supply have been proposed. For example, Japanese Patent Application Laid-Open No. 2000-184615 discloses a technology for managing a battery, which is the backup power supply, to prevent deterioration of the battery.

Specifically, in the above conventional technology, the battery includes a battery management device with which charging control considering a remaining amount of power in the battery is carried out. In addition, a battery pack itself interrupts a charging current. Thus, the battery is prevented from being overcharged, thereby retarding deterioration of the battery. Furthermore, during standby for backup, the battery is charged when the remaining amount of power decreases to a specified amount, thereby resolving insufficiency of power during the standby for backup.

When the disk array apparatus detects power failure, the disk array apparatus switches a power supply from a power supply unit, which generates a voltage used in the disk array apparatus from power supplied from an external power supply, to a battery unit for backup in the disk array apparatus. Specifically, when the disk array apparatus detects power failure, the power supply unit outputs a power-failure detection notice to a monitoring unit that performs switching control for switching a power supplying unit. The monitoring unit outputs a power-failure processing notice to a controller that causes a hard disk to execute the backup processing, and outputs, to the battery unit, an instruction to start supply of power. When the battery unit receives the instruction, the battery unit starts discharge to supply a voltage to a power supply line in the disk array apparatus.

However, a certain amount of time is required for the battery unit to be able to stably supply a voltage of an actually required level after reception the instruction. In other words, that there is a period in which a predetermined voltage is not supplied to the power supply line until the battery unit stably supplies the voltage of the actually required level after detection of the power failure.

To solve such a problem, it is necessary to provide a power supply unit that can supply a voltage to the power supply line during the time (battery warm-up time) until the battery unit supplies the voltage of the required level to the power supply line after detection of the power failure. Therefore, a large capacity capacitor is required to provide a time in which an output is maintained such that the predetermined voltage is supplied to the power supply line even if power is cut from the external power supply. As a result, a size of a circuit of the power supply unit increases.

In addition, the battery warm-up time that is different depending on specifications required for each disk array apparatus requires a custom power supply unit for each disk array apparatus. As a result, a manufacturing cost of the disk array apparatus increases.

SUMMARY OF THE INVENTION

It is an object of the present invention to at least solve the problems in the conventional technology.

A disk array apparatus according to one aspect of the present invention stores data in and reads out data from a recording medium in accordance with an instruction from a host apparatus, and includes the a main power supply line, a battery, a backup power supply, a power supply unit that generates a predetermined voltage from power supplied from an external power supply, and that supplies the voltage to the main power supply line, a battery unit that charges the battery with the voltage supplied, and that determines whether to activate the backup power supply, and a monitoring unit that judges whether the disk array apparatus is in an operation mode, in which the disk array apparatus is operable in accordance with an instruction from the host apparatus and, that outputs an output control signal to the battery unit. The battery unit determines whether to activate the backup power supply based on the output control signal. The monitoring unit outputs an output control signal for activating the backup power supply when it is determined that the disk array apparatus is in the operation mode, and outputs an output control signal for inactivating the backup power supply when it is determined that the disk array apparatus is not in the operation mode.

The other objects, features, and advantages of the present invention are specifically set forth in or will become apparent from the following detailed description of the invention when read in conjunction with the accompanying drawings.

DETAILED DESCRIPTION

Exemplary embodiments of the present invention are explained in detail below with reference to the accompanying drawings.

Figure 1:
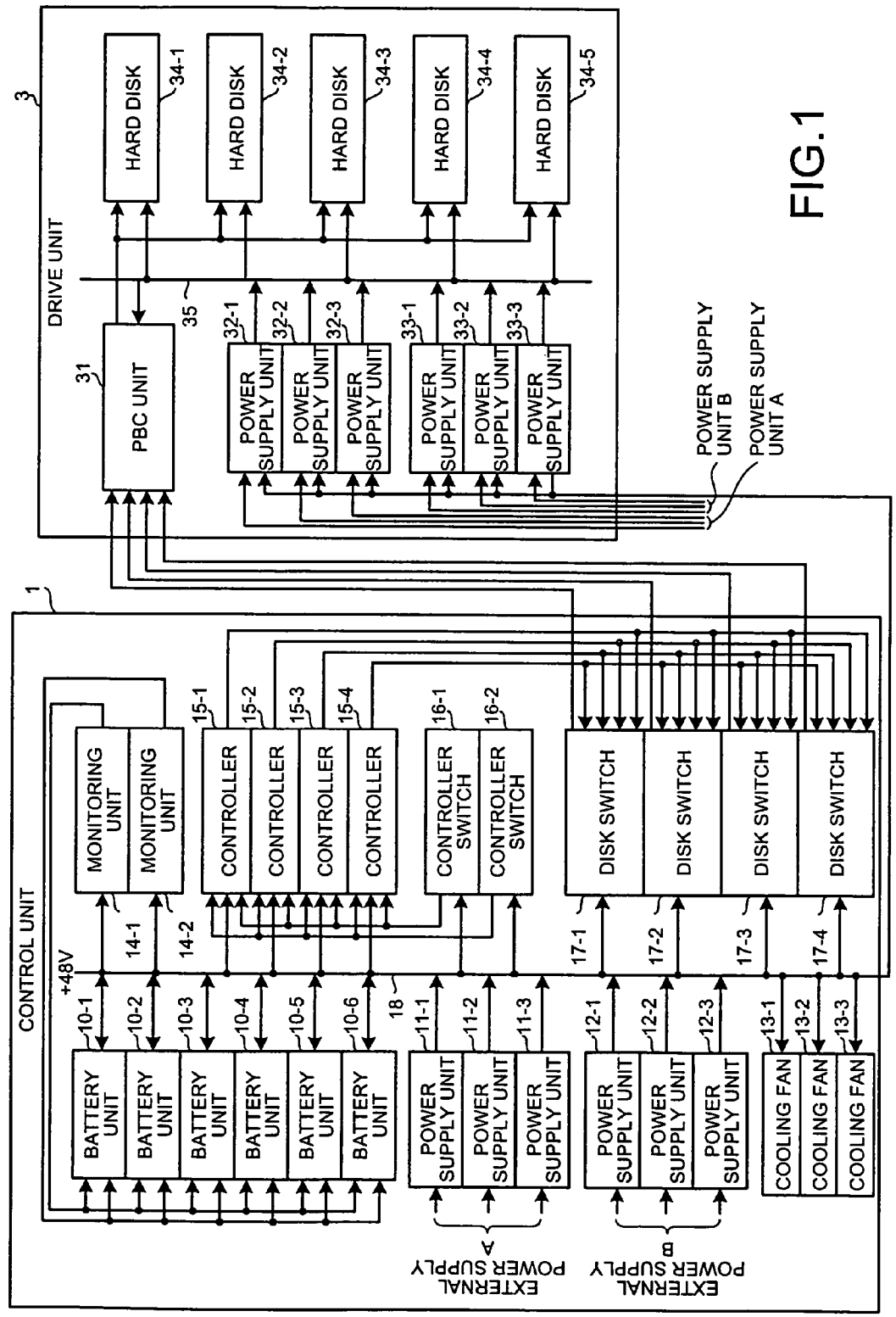
FIG. 1 is a block diagram of a disk array apparatus according to an embodiment of the invention.

FIG. 1 is a block diagram of a disk array apparatus according to an embodiment of the invention. The disk array apparatus shown in FIG. 1 includes a control unit 1 and a drive unit 3. The control unit 1 includes power supply units 11 (11-1 to 11-3) and 12 (12-1 to 12-3), battery units 10 (10-1 to 10-6), cooling fans 12 (13-1 to 13-3), monitoring units 14 (14-1 and 14-2), controllers 15 (15-1 to 15-4), controller switches 16 (16-1 and 16-2), and disk switches 17 (17-1 to 17-4). The drive unit 3 includes power supply unit 32 (32-1 to 32-3) and 33 (33-1 to 33-3), a Port Bypass Circuit (PBC) unit 31, and hard disks (34 (34-1 to 34-5). Note the disk array apparatus includes plural identical components having an identical function to acquire redundancy. However, the disk array apparatus may include only one component for each function. In addition, although the disk array apparatus includes the hard disks 34, a recording medium for storing data is not limited to a hard disk.

The power supply units 11 and 12 generate a voltage of a predetermined value from power supplied from external power supplies A and B, and supplies the voltage to a power supply line 18. The predetermined value is a voltage at which the battery units 10, the cooling fans 13, the monitoring units 14, the controllers 15, the controller switches 16, and the disk switches 17 are operable. For example, the predetermined value is set to 48 volts (V). When power from the external power supplies A and B is cut, that is, when power failure occurs, the power supply units 11 and 12 detect the power failure and output a power-failure detection notice to the monitoring units 14.

While in FIG. 1, power is supplied to the power supply units 11 by the external power supply A, and power is supplied to the power supply units 12 by the external power supply B, power may be supplied from an identical external power supply to both the power supply units 11 and the power supply units 12. However, for reliability of data, it is preferable that power is supplied to each of the power supply units 11 and the power supply units 12 independently from a different power supply. If power is supplied independently, even when power supply is cut from one power supply due to power failure, power can be supplied from another power supply.

When the monitoring units 14 receive the power-failure detection notices from all the power supply units 11 and 12, the monitoring units 14 output a power-failure processing notice to the controllers 15. The monitoring units 14 monitor a power supply switch (not shown) of the disk array apparatus. In addition, the monitoring units 14 output an output signal to the battery units 10. When the power switch is on (in an operation mode), the monitoring units 14 output an output control signal for activating a backup power supply. When the power supply switch is off (in a standby mode), the monitoring units 14 output an output control signal for inactivating the backup power supply.

Figure 2:
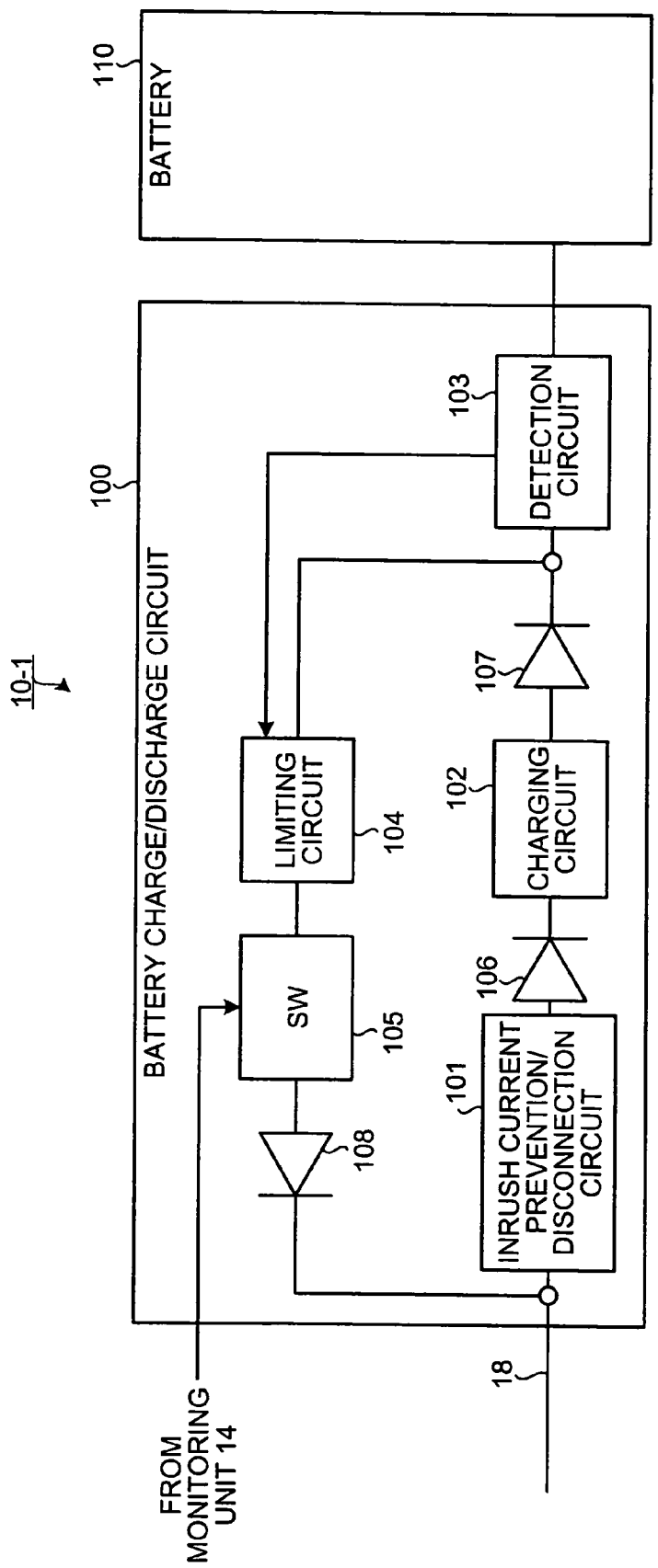
FIG. 2 is a block diagram of a battery unit.

All the battery units 10-1 to 10-6 have the same function. FIG. 2 is a block diagram of a battery unit 10-1. The battery unit 10-1 includes a battery charge/discharge circuit 100 and a battery 110. The battery charge/discharge circuit 100 includes an inrush current prevention/disconnection circuit 101, a charging circuit 102, a detection circuit 103, a limiting circuit 104, a switch (SW) 105, and diodes 106 to 108. The battery charge/discharge circuit 100 charges the battery 110.

The inrush current prevention/disconnection circuit 101 has a function of preventing an inrush current. The disk array apparatus includes plural (in this example, six) battery units 10 to acquire redundancy. Therefore, even during an operation of the disk array apparatus, it is possible to connect the battery units 10 to the power supply line 18 or to disconnect the battery units 10 from the power supply line 18. Connection of the battery units 10 during the operation sometimes causes a current equal to or larger than a standard flowing into the battery units 10. The inrush current prevention/disconnection circuit 101 prevents such an excessive current to protect circuits in the battery units 10.

The charging circuit 102 boosts the voltage of 48 V, which is supplied from the inrush current prevention/disconnection circuit 101 through the diode 106, to a voltage necessary for charging the battery 110 to generate a charging voltage. The detection circuit 103 monitors a direction in which an electric current flows in the circuit, and outputs a limit control signal to the limiting circuit 104 based on a result of monitoring.

The limiting circuit 104 selects whether a voltage supplied based on the limit control signal is to be limited to a predetermined limit value or to be output without being changed. The predetermined limit value is smaller than a voltage that is supplied to the power supply line 18 by the power supply units 11 and 12 and larger than a voltage with which all of the monitoring units 14, the controllers 15, the controller switches 16, the disk switches 17, the cooling fans 13, and the power supply units 32 and 33 are operable. For example, the predetermined limit value is set to 47 V. The limiting circuit 104 outputs either of the voltages to the SW 105 as a backup power source.

The SW 105 is controlled to be on and off based on an output control signal from the monitoring unit 14. When the SW 105 is on, the SW 105 connects the limiting circuit 104 and the diode 108 to activate the backup power supply. When the SW 105 is off, the SW 105 disconnects the limiting circuit 104 and the diode 108 to inactivate the backup power supply.

Referring back to FIG. 1, the cooling fans 13 have a function of cooling the disk array apparatus. The controller switches 16 control the controllers 15 based on an instruction of a host computer (not show) serving as a host apparatus.

The controllers 15 control the PBC unit 31 through the disk switches 17. In addition, when the controllers 15 receive the power failure notice from the monitoring units 14, the controllers 15 output a backup processing notice to the PBC unit 31 through the disk switches 17.

The power supply units 32 and 33 generate a voltage of a predetermined value from power supplied by the external power supplies A and B. The power supply units 32 and 33 supply the voltage to a power supply line 35. In addition, the power supply units 32 and 33 generate a voltage of a predetermined value from the voltage of 48 V supplied from the power supply line 18, and supply the voltage generated to the power supply line 35. The predetermined value is a value of a voltage with which the PBC unit 31 and the hard disks 34 are operable. Note that, while only one power supply line is provided in the drive unit 3 for simplification of explanation, components in the drive unit 3, such as a semiconductor integrated circuit (not shown) in the PBC unit 31 and a drive circuit (not shown) for driving the hard disks 34, do not operate with one voltage in an actual fact. Therefore, the power supply units 32 and 33 generate more than one type of voltages different from each other, and supply each of the voltages to a corresponding power supply line.

The PBC unit 31 is controlled by the disk switches 17 to store data input from the host computer in the hard disks 34. The PBC unit 31 also outputs the data that is stored in the hard disks 34 to the host computer.

Figure 3:
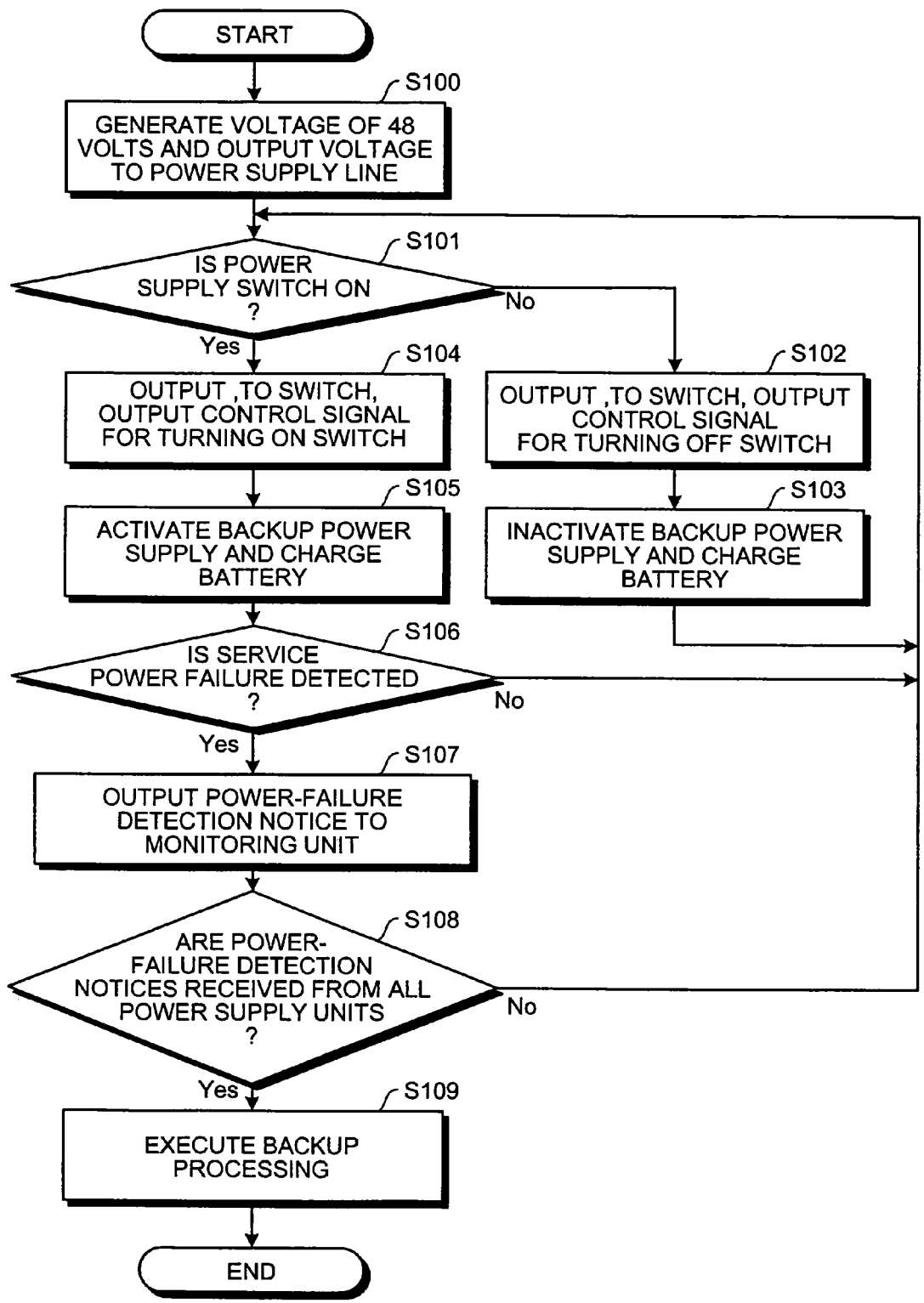
FIG. 3 is a flowchart of an operation of the disk array apparatus.

FIG. 3 is a flowchart of an operation of the disk array apparatus. The power supply units 11 and 12 generate a voltage of 48 V from power supplied from the external power supplies A and B and supply the voltage to the power supply line 18 (step S100).

The monitoring unit 14 monitors the power supply switch and judges whether the power supply switch is on. In other words, the monitoring unit judges whether the disk array apparatus is in an operation mode (the power supply switch is on) or in a standby mode (the power supply switch is off) (step S101).

When the power supply switch is off, the monitoring unit 14 outputs an output control signal for turning off the SW 105 to the SW 105 (step S102). Consequently, the SW 105 is turned off and the limiting circuit 104 and the diode 108 are disconnected from each other. Thus, the backup power supply is inactivated.

Since the voltage of 48 V is supplied to the power supply line 18, the battery charge/discharge circuit 100 inactivates the backup power supply and charges the battery 110 (step S103). Specifically, the charging circuit 102 boosts the voltage of 48 V, which is supplied through the inrush current prevention/disconnection circuit 101 and the diode 106, to a voltage necessary for charging the battery 110. Thus, the charging voltage is generated. The charging circuit 102 outputs the charging voltage to the detection circuit 103 and the limiting circuit 104 through the diode 107.

When the charging circuit 102 outputs the charging voltage, since the charging voltage is higher than a voltage of the battery 110, an electric current flows from the charging circuit 102 to the battery 110, whereby the battery 110 is charged.

On the other hand, when the power supply switch is on, the monitoring unit 14 outputs an output control signal for turning on the SW 105 to the SW 105 (step S104). Consequently, the SW 105 is turned on and the limiting circuit 104 and the diode 108 are connected to each other. Thus, the backup power supply is activated.

Since the voltage of 48 V is supplied to the power supply line 18, the battery charge/discharge circuit 100 activates the backup power supply to charge the battery 110 (step S105). Specifically, the charging circuit 102 boosts the voltage of 48 V to generate the charging voltage. The charging circuit 102 outputs the charging voltage to the detection circuit 103 and the limiting circuit 104 through the diode 107.

When the charging circuit 102 outputs the charging voltage, since the charging voltage is higher than the voltage of the battery 110, an electric current flows from the charging circuit 102 to the battery 110 through the detection circuit 103, whereby the battery 110 is charged.

When the detection circuit 103 detects that an electric current is flowing from the charging circuit 102 to the battery 110 (the battery 110 is being charged), the detection circuit 103 outputs a limit control signal to the limiting circuit 104. When the limiting circuit 104 receives the limit control signal, the limiting circuit 104 limits the voltage input to 47 V and outputs the voltage limited to the SW 105.

Figure 4:
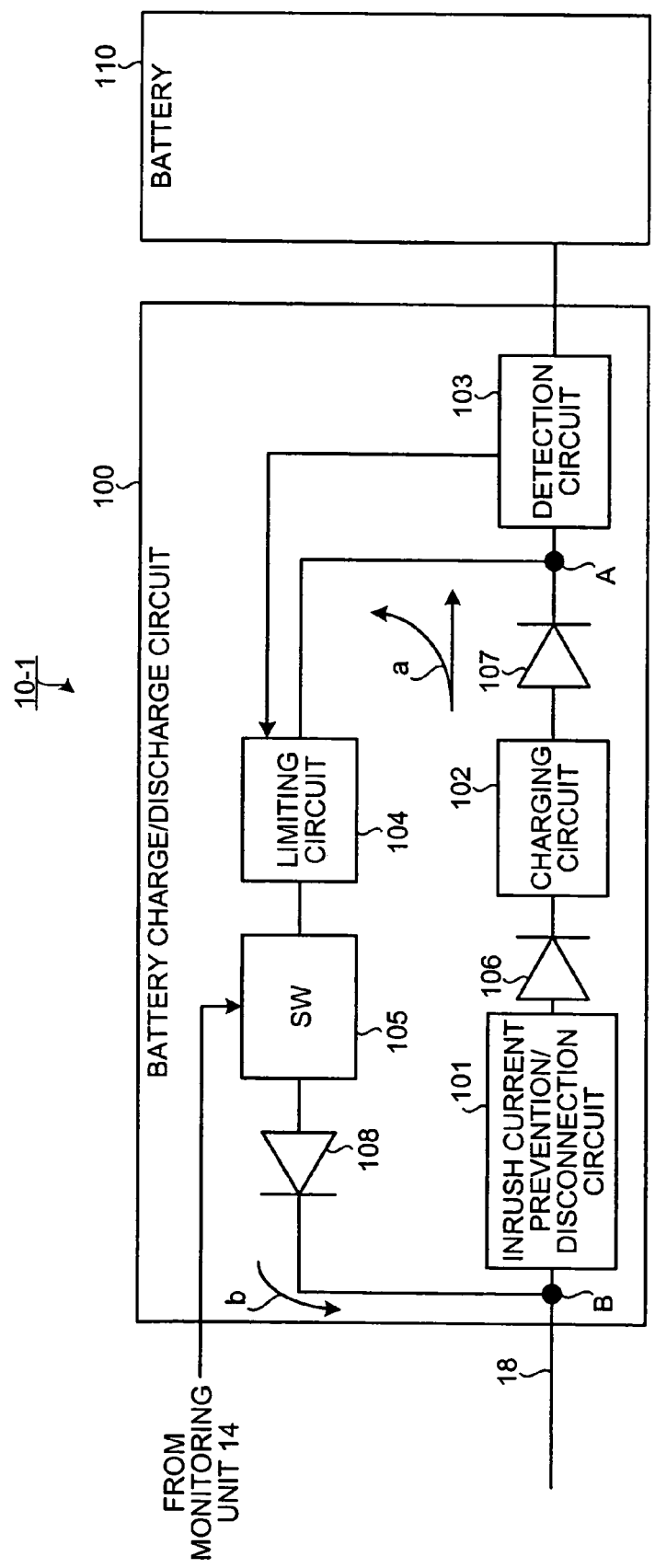
FIG. 4 is a schematic for explaining charging operation of the battery unit.

In a normal operation mode (when the voltage of 48 V is supplied form the power supply units 11 and 12 to the power supply line 18), in the battery unit 10, the charging voltage is supplied in a direction of arrows "a" and charges the battery 110 as shown in FIG. 4. At the same time, the charging voltage is supplied from a point A to the limiting circuit 104. The charging voltage supplied to the limiting circuit 104 is limited to 47 V by the limiting circuit 104 and is applied to a point B through the SW 105 and the diode 108. In other words, the backup power supply having the voltage of 47 V is activated. However, since the voltage of 48 V is supplied to the power supply line 18, even if the backup power having the voltage of 47 V is applied to the point B, the voltage at the power supply line 18 is higher than the voltage of the backup power supply. Thus, an electric current never flows in a direction indicated by an arrow "b". Therefore, the battery 110 is charged without consuming power charged in the battery 110.

When the power supply units 11 and 12 detect power failure (step S106), the power supply units 11 and 12 output the power-failure detection notice to the monitoring unit 14 (step S107).

When the monitoring unit 14 receives the service detection notices from all the power supply units 11 and 12 (step S108), the monitoring unit 14 causes the PBC unit 31 to execute the backup processing (step S109). Specifically, the monitoring unit 14 outputs a power-failure processing notice to the controller 15. The controller 15 outputs a backup processing notice to the PBC unit 31 through the disk switch 17. When the PBC unit 31 receives the backup processing notice, the PBC unit 13 executes the backup processing for writing, in the hard disk 34, data that is held in a volatile cache memory.

Since power from the external power supply A and B is not supplied to the power supply units 11 and 12, a voltage of 48 V is not supplied to the power supply line 18. In other words, the voltage at the power supply line 18 falls as time elapses. When the voltage at the power supply line 18 falls, the charging circuit 102 cannot generate the charging voltage. Thus, a value of the charging voltage decreases. When the charging voltage falls to be lower than the voltage of the battery 110, power is started to be discharged from the battery 110.

Figure 5:
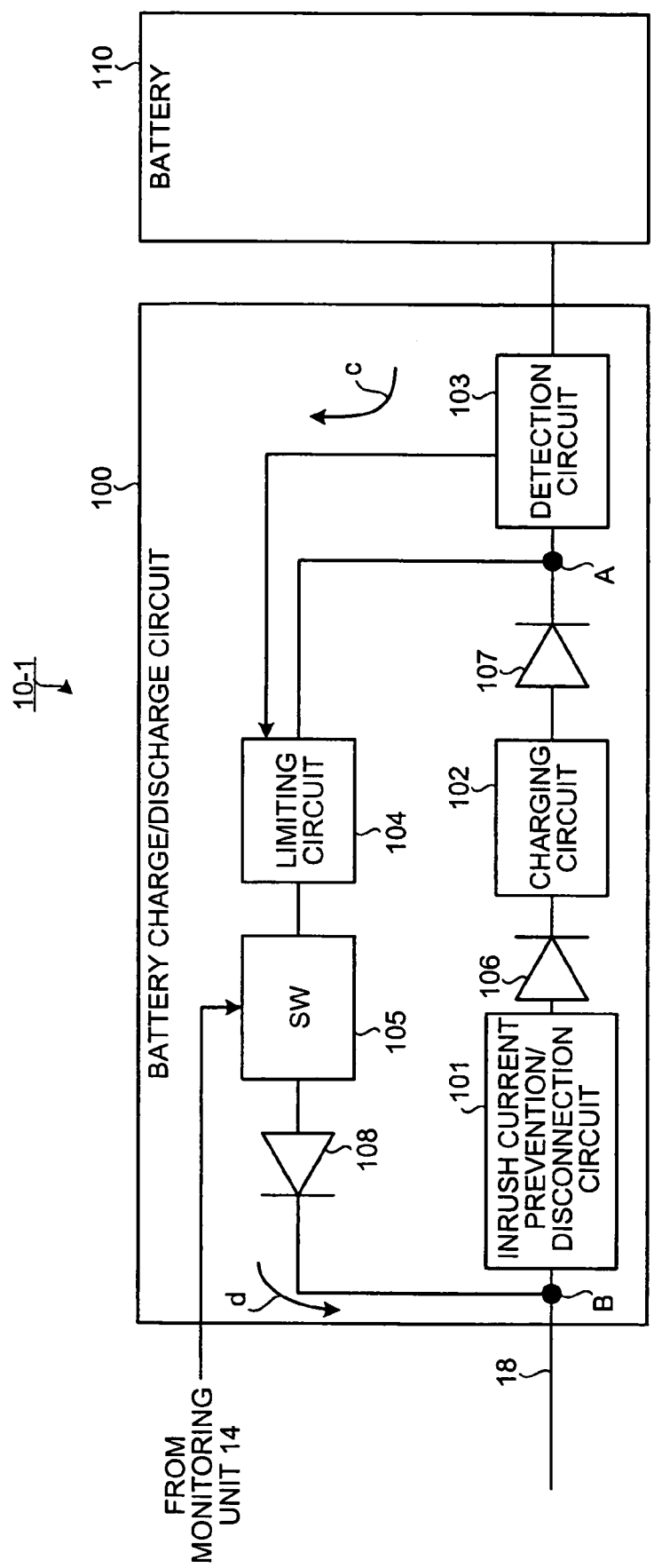
FIG. 5 is a schematic for explaining discharge operation of the battery unit.

Since an electric current is prevented from flowing to the charging circuit 102 by the diode 107, a voltage discharged from the battery 110 is output only in a direction of an arrow "c" shown in FIG. 5. Since the limit control signal is not switchable, the limiting circuit 104 limits the voltage discharged from the battery 110 to 47 V, and outputs the voltage limited to the SW 105.

At the time of power failure (when the voltage of 48 V is not supplied form the power supply units 11 and 12 to the power supply line 18), in the battery unit 10, the voltage of the battery 110 is supplied only in the direction of the arrow "c" (to the limiting circuit 104) as shown in FIG. 5. The voltage of the battery 110 supplied to the limiting circuit 104 is limited to 47 V by the limiting circuit 104 and applied to the point B through the SW 105 and the diode 108. In other words, the backup power supply of 47 V is activated. Since supply of a voltage from the power supply units 11 and 12 is stopped, the voltage of the backup power supply is higher than the voltage at the power supply line 18 at the point B, an electric current flows in a direction indicated by an arrow "d", and the voltage of the backup power supply is supplied to the power supply line 18.

On the other hand, when a predetermined time elapses after the detection circuit 103 detects that an electric current flows in a direction from the battery 110 to the point A (charging of the battery 110 is started), the detection circuit 103 outputs a limit control signal for outputting a voltage without limiting, to the limiting circuit 104.

When the limiting circuit 104 receives the limit control signal from outputting the voltage without limiting, the limiting circuit 104 outputs the voltage supplied from the battery 110 to the SW 105 directly. The predetermined time is time until an output from the battery 110 is stabilized after discharge from the battery 110 is started. In this case, the predetermined time is time until the voltage of the battery 110 falls to be equal to or lower than the voltage of 48 V or the voltage of 47 V that is the limit value of the limiting circuit 104.

On the other hand, since the supply of power from the external power supplies A and B is stopped, the power supply units 32 and 33 cannot supply a voltage to the power supply line 35. However, as described above, a voltage is supplied to the power supply line 18 by the backup power supply discharged from the battery 110. However, the power supply units 32 and 33 can supply a voltage to the power supply line 35 using the voltage supplied from the power supply line 18. Therefore, the PBC unit 31 can execute the backup processing for storing data under processing (data held in a cache memory, not shown) according to a backup processing notice sent from the controller 15 through the disk switch 17.

In this manner, in the present embodiment, the power supply units 11 and 12 generate a predetermined voltage from power supplied by the external power supplies A and B, and output the voltage to the power supply line 18. The battery charge/discharge circuit 100 charges the battery 110 with the voltage supplied to the power supply line 18 and selects whether an output voltage of the battery 110 is supplied to the power supply line 18 based on the output control signal to activate the backup power supply. The monitoring unit 14 judges whether the disk array apparatus is in an operation mode in which the disk array apparatus is operable in accordance with an instruction of the host computer. When the disk array apparatus is in the operation mode, the monitoring unit 14 outputs the output control signal for activating the backup power supply to the battery charge/discharge circuit 100. When the disk array apparatus is not in the operation mode, the monitoring unit 14 outputs the output control signal for inactivating the backup power supply. Consequently, when power failure occurs, the disk array apparatus shifts a voltage supply source for the power supply line 18 from the power supply units 11 and 12 to the battery unit 10 without performing a switching operation for supplying an output voltage of the battery 110 to the power supply line 18 after detection of the power failure. Thus, it is possible to reduce a time in which an output should be maintained.

Since such time is reduced, it is possible to reduce a capacity of capacitors of the power supply units 11 and 12, and to reduce a circuit size of the power supply units 11 and 12.

In an operation mode in which the disk array apparatus is operable in accordance with an instruction from the host apparatus, a voltage generated by the power supply units 11 and 12 and an output voltage of the battery 110 are supplied to the power supply line 18. When power failure occurs, the disk array apparatus shifts the voltage supply source for the power supply line 18 from the power supply units 11 and 12 to the battery unit 10 without performing a switching operation after detecting that supply of power from the external power supplies is stopped. Thus, a time in which an output is to be maintained becomes identical for any type of disk array apparatus. Therefore, development of the power supply units 11 and 12 that are suitable for each type of the disk array apparatus is not necessary. Thus, it is possible to obtain a disk array apparatus that can apply a general purpose power supply, thereby reducing a manufacturing cost of the disk array apparatus.

In the operation mode in which the disk array apparatus is operable in accordance with an instruction from the host apparatus, a voltage generated by the power supply units 11 and 12 and an output voltage of the battery 110 are supplied to the power supply line 18. In addition, when it is detected that supply of power from the external power supplies A and B is stopped, the backup processing for storing, in a recording medium, data under processing is executed. Thus, when power failure occurs, it is possible to shift a voltage supply source for the power supply line 18 from the power supply units 11 and 12 to the battery unit 10, and is possible to execute the backup processing without performing a switching operation after detection of the power failure.

When the backup power supply is activated, an output voltage of the battery 100 is set to be lower than a voltage supplied to the power supply line 18 by the power supply units 11 and 12 and higher than a voltage at which the backup processing can be executed. Thus, it is possible to reduce the consumption of power charged in the battery 100 when a voltage is supplied from the power supply units 11 and 12. Thus, even when the disk array apparatus shifts the voltage supply source to the battery unit 10, it is possible to securely execute the backup processing.

According to the invention, it is possible to obtain a disk array apparatus using a power supply unit with a reduced circuit size.

Moreover, according to the present invention, it is possible to obtain a disk array apparatus, which can apply a general purpose power supply, without developing a custom power supply unit for each type of a disk array apparatus.

Furthermore, according to the present invention, it is possible to obtain a disk array apparatus that, when power failure occurs, can shift a voltage supply source for a main power supply line from a power supply unit to a battery unit, and to execute a backup processing without performing a switching operation.

Moreover, according to the present invention, it is possible to obtain a disk array apparatus that can reduce consumption of power charged in a battery.

Furthermore, according to the present invention, it is possible to obtain a disk array apparatus that can securely execute a backup processing even when the disk array apparatus shifts a voltage supply source for a main power supply line from a power supply unit to a battery unit.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A disk array apparatus that stores data in and reads out data from a recording medium by using power supplied from a main power supply line, the disk array apparatus comprising:
    a power supply unit that generates a first voltage enough to drive the disk array apparatus from power supplied from an external power, and that supplies the first voltage to the main power supply line;
    a battery that is charged by a charging voltage generated from the first voltage supplied from the main power supply line; and
    a voltage supply circuit that is arranged between the battery and the main power
    supply line, and that supplies a second voltage to the main power supply line when voltage of the battery is smaller than the charging voltage, whereas that supplies a voltage obtained by discharging of the battery to the main power supply line when the voltage of the battery is larger than the charging voltage, wherein the second voltage is generated by limiting the charging voltage to a smaller level than the first voltage.

2. The disk array apparatus according to claim 1, wherein the voltage supply circuit includes
    a limiting circuit that limits the charging voltage to the smaller level than the first voltage to generate the second voltage when the voltage of the battery is smaller than the charging voltage, and
    a switch that switches between supplying and not supplying the second voltage to the main power supply line.

3. The disk array apparatus according to claim 2, further comprising a monitoring unit that determines whether the disk array apparatus is operable or not, and that outputs a control signal directing the switch to supplying the second voltage when it is determined that the disk array apparatus is operable.

4. The disk array apparatus according to claim 3, wherein
    the power supply unit detects power failure when power supplied from the external power supply is cut, and outputs a power failure notice to the monitoring unit when power failure is detected, and
    the monitoring unit executes a backup processing for storing data under processing in the recording medium when the power failure notice is received.

5. The disk array apparatus according to claim 2, wherein the limiting circuit generates the second voltage equal to or larger than a voltage enough to execute a backup processing for storing data under processing in the recording medium.

6. The disk array apparatus according to claim 2, further comprising a
    detecting circuit that detects the discharging of the battery, and that makes the limiting circuit halt limiting the charging voltage when a predetermined time elapses after the discharging of the battery is started.

* * * * *